Jan. 29, 1924.
G. A. LYON
1,481,966
AUTOMOBILE BUFFER
Original Filed Nov. 23, 1921
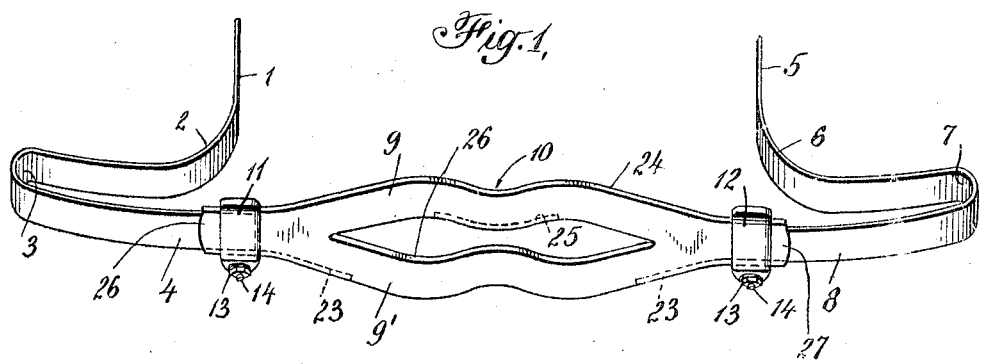
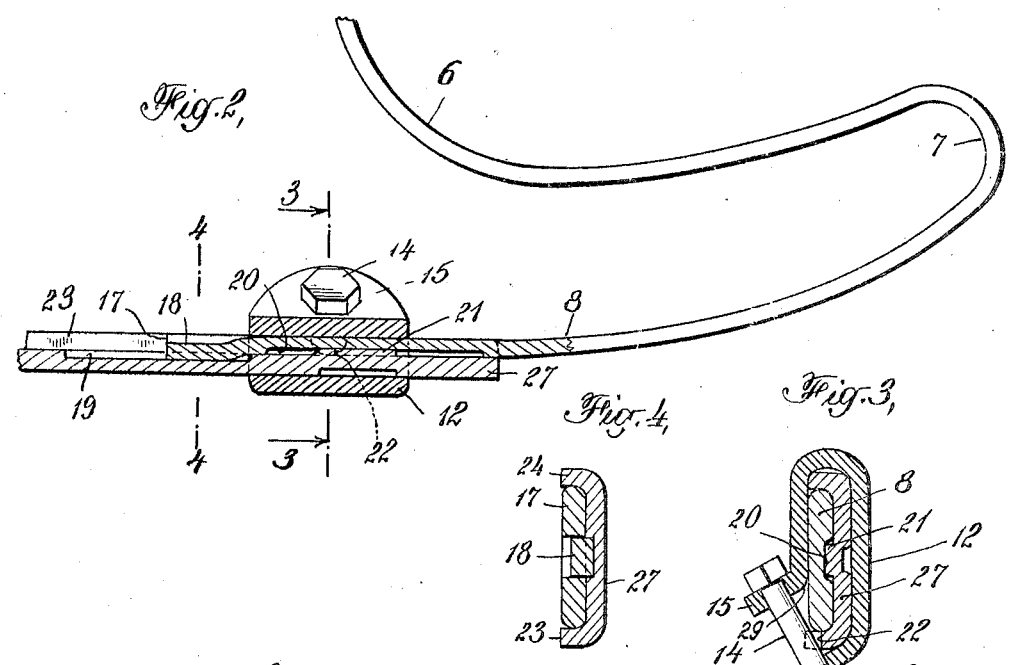
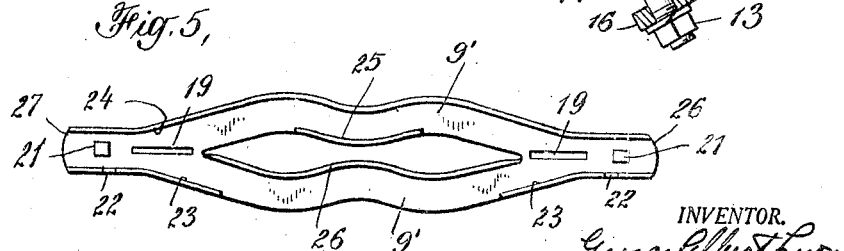
INVENTOR.
George Albert Lyon
BY
Harry L. Duncan
ATTORNEY.

Patented Jan. 29, 1924.

1,481,966

UNITED STATES PATENT OFFICE.

GEORGE ALBERT LYON, OF PHILADELPHIA, PENNSYLVANIA.

AUTOMOBILE BUFFER.

Application filed November 23, 1921, Serial No. 517,268. Renewed November 3, 1923.

*To all whom it may concern:*

Be it known that I, GEORGE ALBERT LYON, a citizen of the United States, and resident of Philadelphia, county of Philadelphia, State of Pennsylvania, have made certain new and useful Inventions Relating to Automobile Buffers, of which the following is a specification, taken in connection with the accompanying drawing.

This invention, which is a continuation in part of that disclosed in my copending application Serial No. 477,586, filed June 14, 1921, relates especially to resilient buffer or bumper devices for automobiles or other vehicles in which the spring steel or other resilient strips or members have clamped or connected thereto a resilient sheet metal contact connecting device having a vertically wide contact face throughout the central part of the buffer and preferably having end connector portions formed with one or more separated sets of aligning devices, such as edges flanges or other projections or recesses with which co-operate corresponding aligning members on the connector portion of the other buffer strips or members clamped or connected thereto. Such a front plate or contact connecting device may advantageously be formed of spring steel strip or sheet metal $\frac{7}{16}$ to $\frac{3}{8}$ of an inch thick more or less and having, if desired, vertically separated contact portions and also stiffening flanges on one or more edges to stiffen and strengthen the same. It is also desirable to have aligning flanges or projections formed on one or preferably both edges of the front plate adjacent its ends so as to have desirable aligning action on the co-operating buffer members which may be of spring steel strip comprising integral or connected attaching members, end loops and inturned connector portions. These co-operating connector portions may be bolted or clamped together in any suitable way and for many purposes it is desirable to have enclosing clamping devices extending substantially around these co-operating connector portions and forcing them together by the action of a tightening bolt and for this purpose the clamping device may have an angular bolt engaging portion adjacent the vertical center of the end loop strip or inturned connector portion so that when the bolt is forwardly inclined after passing through this angular bolt engaging portion it draws the adjacent clamping bend of the clamping device forward strongly into engagement and not only prevents rattle or looseness, but insures good aligning contact between the parts. Such clamping devices may, of course, be used where neither of the co-operating buffer connector portions have edge flanges and it is desirable in some cases to have the bolt so positioned that its shank is normally in substantial holding engagement with the adjacent edge of the co-operating buffer member past which it extends in angular position and the tightening of the bolt naturally forces the bolt shank into stronger holding engagement with this edge which may be provided with one or more bolt aligning nicks or depressions where it is desired to positively position the bolt shank and clamping device longitudinally of the co-operating spring strip or other buffer members. Where the upper and lower edges of this front plate diverge adjacent the clamping device it is often important where the front plate is made by bending a sheet metal blank to provide inner aligning means to hold the two co-operating buffer members in vertical alignment inside of the clamping device and for this purpose recesses or projections may be formed on either or both of these members, preferably including an aligning depression or recess in the front plate so as to co-operate with an aligning tongue or projecting portion at the end of the co-operating buffer strips or members and hold these parts in vertical alignment.

In the accompanying drawing showing in a somewhat diagrammatic way an illustrative embodiment of this invention:

Fig. 1 is a front perspective view showing an illustrative form of buffer.

Fig. 2 is an enlarged top view showing parts of the same partly in section.

Figs. 3 and 4 are transverse sections thereof taken along the lines 3—3 and 4—4 of Fig. 2, and Fig. 5 is a rear view of the front plate or member.

The automobile buffer may have any desired or suitable construction and preferably comprises one or more pieces of spring steel strip which at the buffer front may in some cases be arranged in overlapping or reinforcing position, although in most cases it is more desirable to have these front strips extend toward and in line with each other without substantial overlapping. As is indicated in Fig. 1, a modified Lyon type spring buffer is shown comprising the attaching arm or member such as 1, connected with the end loop 3 through the outwardly extending bent or curved portion 2. This spring steel strip which may, of course, be hardened and tampered after it is bent into the desired form, may be extended inward from the end loop 3 so as to provide the inturned front strip or connector portion 4 for co-operation with the buffer front plate or contact connecting device 10. The other attaching member 5 may have integrally or otherwise connected thereto the end loop 7 and intermediate yielding bend 6 while the forward portion of this strip may be formed into the inturned front connector portion 8 adapted to be bolted, clamped or otherwise rigidly connected with the opposite end of the front plate 10.

This buffer plate may be advantageously formed of a single piece of spring steel plate about a quarter of an inch thick more or less which may be blanked out and then forged or bent in dies or otherwise so that the parts are given the desired form before the hardening and tempering of the plate, which is usually advantageous with this construction. In this way the front plate may be formed with several contact faces such as 9, 9′, which may have suitable stiffening or strengthening flanges such as 23, 24 extending more or less along the upper and lower edges of the plate, while upper and lower mid flanges 25, 26 may also be formed along the edges of the central opening which may be given the double diamond shaped contour indicated in Figs. 1 and 5, if desired. The extent and location of these stiffening flanges of course depends considerably on the length and thickness of the front plate which may, as indicated, be given a total length sufficient to extend somewhat past the attaching members of the buffer while the vertical width of this contact connecting member may be 6 or 8 inches or more, if desired. Under these conditions the upper top flange 24 may extend entirely across this front plate, which is desirable for the purpose of stiffening the same, and the lower mid flange 26 may also extend across the entire upper edge of the central opening in the front plate. The other flanges need not in all cases be continuous and, as shown, the upper mid flange 25 extends about half way across the central opening, while the lower edge flanges 23 extend inwardly in line therewith at their inner ends, so that they reinforce and stiffen the plate adjacent the ends of the central opening. It is usually desirable where the outline of the front plate is to be kept smooth adjacent the ends of these stiffening flanges, to form cuts at the end of each flange, such as 23, for instance, in a direction transverse to the plate edge, shown in Figs. 1 and 5, so that the flange end can be bent inward without distorting or drawing in the adjacent edge of the plate. Furthermore, these edge flanges, 23, 24, may be used with advantage at the ends of the front plate to promote the vertical alignment of the co-operating inturned connector portions which may fit fairly snugly within these flanges or within more or less separated projections on the plate edge or on the flanges themselves in some cases. As shown in Figs. 3 and 5, these aligning flanges may be substantially parallel for a considerable distance adjacent the ends 26, 27 of the front plate, so as to practically engage the edges of the inturned connector portion or front strip 8, which may be clamped or bolted thereto in any suitable way. For this purpose specially wide enclosing clamping devices such as 11, 12 are often desirable, especially when formed with a clamping bend 29, co-operating with an intermediate or midportion of the rear buffer strip or member. When the adjacent angular bolt engaging portion 15 of the clamping device is formed with an inclined bolt hole, as indicated in Fig. 3, the tightening bolt 14 may pass downward and forward through this hole and through a co-operating hole in the lower front end 16 of the clamping device so that when the nut 13 is tightened these parts are forced together and the clamping bend 29 is forced strongly into engagement with the rear face of the inturned connector portion regardless of the contact produced at the edges of this strip. This tightening action also forces the bolt shank laterally toward or against the adjacent edge of the co-operating buffer member so that it may be forced into holding engagement therewith to give quite effective aligning action, especially where the bolt shank is hardened and tempered, or where one or more nicks or aligning depressions are formed in the buffer member. A bolt aligning nick or depression such as 22 may thus be formed in the lower flange 23 of the front plate, or at least an aligning projection may be formed outside of this desired position of the bolt which when once inserted is thus prevented from moving to an undesirable extent longitudinally of the front plate.

In some cases it is quite desirable to have other vertical aligning means inside of these edge flanges, especially where the edge flanges of the front plate diverge adjacent the clamping device or near the ends 26, 27 of the front plate. Under such conditions co-operating aligning members or portions may be formed in the front plate and strip end so as to promote their vertical alignment. As indicated in Figs. 2, 4 and 5, an aligning depression or recess 19 may in many cases be advantageously formed in the front plate by a die operation while the metal is hot, so that the metal is forced out laterally to form a definite recess or depression which may extend half way or more through the front plate, if desired. The inturned strip end may be formed with a co-operating aligning tongue or portion such as 18, which is shown as more or less separated by longitudinal cuts from the adjacent end portions 17 of the strip and also depressed at the end of the strip for an inch or so, if desired, so as to engage different aligning recesses in the front plate as shown in Figs. 2 and 4, and definitely guide the strip end in connection with the edge flanges or other aligning means provided near the end of the front plate. In some cases where it is desirable to omit the edge flanges from the end of the front plate, aligning devices may be used at this point such, for instance, as a co-operating aligning recess in the front plate, such as the outwardly extending recess 19 with which a projection in the inturned connector portion may co-operate. If desired, however, this arrangement may be reversed and the projecting aligning portion such as 21 may be formed on the rear face of the front plate, preferably beneath the clamping device where it can be concealed and the aligning recess or depression such as 20 may be formed by die stamping operations in the front face of the co-operating inturned connector portion 8 of the other buffer member. While of course it is not necessary in many cases to use all of these aligning devices, several of them may sometimes be used at the same time to promote the vertical alignment of these parts, although for most purposes the edge flanges or aligning projections adjacent the ends of the front plate are usually sufficient in connection with suitable inner aligning means adjacent the ends of the inturned connector portions of these front strips.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims:

1. The automobile buffer comprising end loop attaching members of spring steel strip having inturned front connector portions formed adjacent their ends with forwardly projecting aligning portions adjacent the center of the strips, a co-operating spring steel front plate having end connector portions formed with inwardly diverging edge aligning flanges and having a middle portion formed with vertically separated upper and lower contact faces and enclosing clamping devices adapted to be bolted around said co-operating connector portions and co-operating recessed aligning portions formed in said front plate at a considerable distance inward from its ends.

2. The automobile buffer comprising end loop attaching members of spring steel strip having inturned front connector portions formed adjacent their ends with forwardly projecting aligning portions, a co-operating spring steel front plate having end connector portions formed with edge aligning flanges and having a middle portion formed with vertically separated upper and lower contact faces and clamping devices adapted to connect said co-operating connector portions and co-operating recessed aligning portions formed in said front plate at a considerable distance inward from its ends.

3. The automobile buffer comprising end loop members of spring steel strip having inturned front connector portions, and a connected co-operating spring steel front plate having end connector portions formed with diverging edge aligning flanges and having a vertically wide middle portion formed with substantially parallel upper and lower contact faces, there being co-operating recessed and projecting aligning portions formed in said connector portions at a considerable distance inward from the ends of said front plate.

4. The automobile buffer comprising end loop members having inturned front connector portions, and a connected co-operating front plate having end connector portions formed with edge flanges and having a vertically wide middle portion, there being co-operating recessed and projecting aligning portions formed in said connector portions at a considerable distance inward from the ends of said front plate.

5. The automobile buffer front comprising end strip members having inturned front connector portions formed adjacent their ends with aligning portions adjacent the center of the strip, a detachably connected spring steel front plate having end connector portions and having a vertically wide middle portion and laterally separated sets of co-operating recessed and projecting aligning portions formed in said connector portions at each end of said front plate.

6. The automobile buffer front comprising end strip members having inturned front connector portions, a connected front plate having end connector portions and having a vertically wide middle portion and laterally separated co-operating recessed and projecting aligning portions formed in said connector portions at each end of said front plate.

7. The one piece spring steel buffer contact and connecting device adapted for use with spring strip automobile buffer members and comprising vertically separated contact faces adjacent its middle portion and comprising end connector portions formed with edge aligning flanges, one of said flanges being formed with bolt aligning depression adapted to position the co-operating clamping devices with respect thereto, there being vertically aligning depressions formed in the rear face of said contact connecting device at a considerable distance inward from its ends to promote the alignment of the cooperating strip members.

8. The one piece steel buffer contact and connecting device adapted for use with spring strip automobile buffer members and comprising vertically separated contact faces adjacent its middle portion and comprising end connector portions formed with edge aligning flanges, there being vertically aligning means formed in the rear face of said contact connecting device at a considerable distance inward from its ends to promote the alignment of the co-operating strip.

9. The one piece spring steel buffer contact and connecting device adapted for use with spring strip automobile buffer members and comprising vertically wide contact portions adjacent its middle portion and comprising end connector portions formed with edge aligning projections, including a bolt aligning projection to position a clamping device with respect thereto, there being vertically aligning means formed in the rear face of said contact connecting device at a considerable distance inward from its end to promote the alignment of the co-operating buffer members.

10. The buffer contact and connecting device adapted for use with buffer members and comprising vertically wide contact portions adjacent its middle portion and comprising end connector portions formed with edge aligning projections, there being vertically aligning means formed in the rear face of said contact connecting device at a considerable distance inward from its ends to promote the alignment of the co-operating buffer members.

11. The one piece resilient buffer contact and connecting device adapted for use with co-operating spring strip end loop buffer members and comprising vertically separated contact faces adjacent its middle portion and comprising edge stiffening flanges forming diverging flanges adjacent the ends of the connecting device, there being vertically aligning depressions formed in the intermediate portions of the rear face of said connecting device at a considerable distance inward from its ends to promote the alignment of the co-operating buffer members.

12. The buffer contact and connecting device adapted for use with co-operating buffer members and comprising vertically wide contact portions adjacent its middle portion and comprising edge stiffening flanges forming diverging aligning flanges adjacent the ends of the connecting device, there being vertically aligning depressions formed in the intermediate portions of the rear face of said connecting device at a considerable distance inward from its ends to promote the alignment of the co-operating buffer members.

13. The buffer contact and connecting device adapted for use with co-operating buffer members and comprising vertically wide contact portions adjacent is middle portion and comprising edge stiffening flanges forming diverging aligning projection adjacent the ends of the connecting device, there being vertically aligning means formed in the intermediate portions of the rear face of said connecting device at a considerable distance inward from its ends to promote the alignment of the co-operating buffer members.

14. The one piece resilient buffer contact and connecting device adapted for use with laterally extending spring strip buffer members and comprising vertically wide contact portions adjacent its middle portion and comprising end connector portions formed adjacent the ends of the connecting device with edge flange aligning means, there being co-operating vertically aligning depressions formed in the rear face of said contact connecting device at a considerable distance inward from said aligning means to promote the alignment of the co-operating strip members.

15. The resilient buffer contact and connecting device adapted for use with laterally extending spring strip buffer members and comprising vertically wide contact portions adjacent its middle portion and comprising end connector portions formed adjacent the ends of the connecting device with aligning means, there being co-operating vertically aligning depressions formed in the rear face of said contact connecting device at a considerable distance inward from said aligning means to promote the alignment of the co-operating strip members.

16. The resilient buffer contact and connecting device adapted for use with laterally extending spring strip buffer members and comprising vertically wide contact portions adjacent its middle portion and comprising end connector portions formed adjacent the ends of the connecting device with aligning means, there being co-operating vertically aligning portions formed adjacent the center of the rear face of said contact connecting device at a considerable distance inward from said aligning means to promote the alignment of the co-operating strip members.

17. The one piece spring steel buffer contact and connecting plate adapted for use with spring strip automobile buffer members and comprising vertically separated contact faces adjacent its middle portion and formed with bent up edge stiffening flanges including diverging flanges adjacent its ends, the inner ends of some of said flanges being separated from the adjacent plate by a cut transverse to the adjacent edge of the plate to promote the smooth outline of the plate.

18. The buffer contact and connecting plate adapted for use with spring strip automobile buffer members and comprising vertically wide contact portions adjacent its middle portion and formed with bent up edge stiffening flanges, the ends of some of said flanges being separated from the adjacent plate by a cut transverse to the adjacent edge of the plate to promote the smooth outline of the plate.

19. The automobile buffer comprising a buffer front member having flanged connector portions, a spring strip buffer member having a co-operating connector portion and an enclosing clamping device bolted around said co-operating connector portions and having an angular bolt engaging portion formed with a bolt hole and having an adjacent clamping bend adapted to engage the co-operating spring strip buffer member adjacent its mid portion and an inclined clamping bolt forcing together the ends of said clamping device and simultaneously forcing the bolt shank into holding co-operation with the adjacent edge of the co-operating buffer member and forcing said clamping bend into holding engagement, the adjacent edge flange of said buffer front member having a bolt aligning portion to co-operate with said bolt shank and positively position the clamping device thereon.

20. The automobile buffer comprising a buffer member having flanged connector portions, a buffer member having a co-operating connector portion and an enclosing clamping device bolted around said co-operating connector portions and having an angular bolt engaging portion formed with a bolt hole and having an adjacent clamping bend adapted to engage the co-operating buffer member adjacent its mid portion and an inclined clamping bolt forcing together the ends of said clamping device and simultaneously forcing the bolt shank into holding co-operation with the adjacent edge of the co-operating buffer member and forcing said clamping bend into holding engagement.

21. The automobile buffer comprising a buffer front member having a connector portion, a spring strip buffer member having a co-operating connector portion and an enclosing clamping device bolted around said co-operating connector portions and having an angular bolt engaging end portion and having an adjacent clamping bend adapted to engage the co-operating buffer member adjacent its mid portion and inclined clamping bolt tightening means forcing together the ends of said clamping device and simultaneously forcing said clamping bend into holding engagement.

22. The automobile buffer comprising a buffer front member having a connector portion, a buffer member having a co-operating connector portion and an enclosing clamping device bolted around said co-operating connector portions and having an angular end portion and having an adjacent clamping bend adapted to engage the co-operating buffer member adjacent its mid portion and tightening means forcing together the ends of said clamping device and simultaneously forcing said clamping bend into holding engagement.

23. The enclosing clamping device for automobile buffers adapted to be clamped around co-operating buffer members and comprising angular bolt engaging ends formed with bolt holes and having clamping bend adjacent one of said ends and adapted to engage the co-operating buffer member adjacent its mid portion and an inclined clamping bolt having a hardened shank passing through said holes and forcing together the ends of said clamping device and simultaneously forcing said clamping bend into holding engagement and forcing the bolt shank into co-operation with the adjacent edge of the co-operating buffer member.

24. The enclosing clamping device for automobile buffers adapted to be clamped around co-operating buffer members and comprising angular bolt engaging ends formed with bolt holes and having clamping bend adjacent one of said ends and adapted to engage the co-operating buffer member adjacent its mid portion and an inclined clamping bolt passing through said holes and forcing together the ends of said clamping device and forcing said clamping bend into holding engagement and forcing the bolt shank toward the adjacent edge of the co-operating buffer member.

25. The enclosing clamping device for automobile buffers adapted to be clamped around co-operating buffer members, and having an angular bolt engaging end portion and having an adjacent clamping projection adapted to co-operate with the adjacent buffer member at a point considerably away from its edge portions and inclined clamping bolt tightening means forcing together the ends of said clamping device and simultaneously forcing said clamping projection into holding co-operation with the adjacent buffer member.

26. The enclosing clamping device for automobile buffers adapted to be clamped around co-operating buffer members, and having an angular end portion and having an adjacent clamping projection adapted to co-operate with the adjacent buffer member at a point considerably away from its edge portions and tightening means forcing together the ends of said clamping device and simultaneously forcing said clamping projection into holding co-operation with the adjacent buffer member.

GEORGE ALBERT LYON.